United States Patent Office 3,547,934
Patented Dec. 15, 1970

---

3,547,934
TETRACHLOROETHYL ESTERS OF PYRIDYL CARBAMIC ACIDS, THE CORRESPONDING MONO- AND DI-THIOCARBAMATES AND DERIVATIVES
Frank Ross, Villa Park, Ill., assignor to Velsicol Chemical Corporation, Chicago, Ill., a corporation of Delaware
No Drawing. Filed Dec. 20, 1968, Ser. No. 785,749
Int. Cl. C07d *31/36*
U.S. Cl. 260—295.5  2 Claims

ABSTRACT OF THE DISCLOSURE

This invention discloses new compounds of the formula

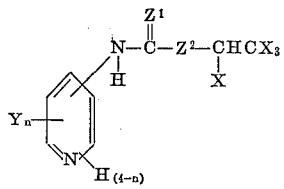

wherein each X is halogen; $Z^1$ and $Z^2$ are selected from the group consisting of oxygn and sulfur; Y is selected from the group consisting of halogen and alkyl; and $n$ is an integer from 0 to 2. The compounds of the above description are useful as plant defoliants and as herbicides.

---

This invention relates to new chemical compositions of matter and more particularly to new compounds of the formula

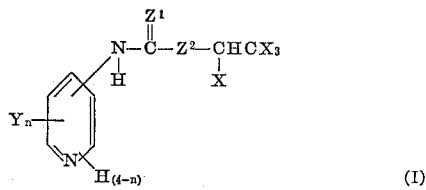

(I)

wherein each X is halogen; $Z^1$ and $Z^2$ are selected from the group consisting of oxygen and sulfur; Y is selected from the group consisting of halogen and alkyl; and $n$ is an integer from 0 to 2.

In a preferred embodiment of this invention each X is selected from the group consisting of chlorine and bromine; $Z^1$ and $Z^2$ are oxygen; and Y is selected from the group consisting of chlorine, bromine and alkyl of from 1 to 6 carbon atoms.

The compounds of the present invention are unexpectedly useful as plant defoliants and as herbicides.

The compounds of this invention can be readily prepared by reacting an aminopyridine of the formula

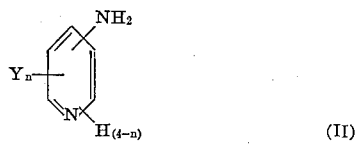

(II)

wherein Y and $n$ are as heretofore described with about an equimolar amount of a chloroformate of the formula

(III)

wherein X, $Z^1$ and $Z^2$ are as heretofore described. This reaction can be effected in an inert organic reaction medium such as ether by adding the chloroformate of Formula III to the aminopyridine of Formula II in the presence of an acid acceptor such as a tertiary amine or an alkali metal carbonate or hydroxide. Temperatures of from about —20° C. to about 80° C. and preferably temperatures of from about —10° C. to about 20° C. can be suitably employed. Upon completion of the reaction the desired product can be recovered by filtration if the product forms as a precipitate or by evaporation of the solvent used if soluble therein. The product can then be used as such or can be purified by washing, recrystallizing and other common techniques in the art.

Exemplary aminopyridines for preparing the compounds of the present invention are 2-aminopyridine, 3-aminopyridine, 4 - aminopyridine, 2 - chloro - 3 - aminopyridine, 3 - amino - 5 - bromopyridine, 3 - amino - 5-methylpyridine, 2 - amino - 6 - ethylpyridine, 3 - amino-4 - n - butylpyridine, 3 - amino - 5 - n - hexylpyridine, and the like.

Suitable chloroformates for preparing the compounds of this invention are $\alpha,\beta,\beta,\beta$-tetrachloroethyl chloroformate, $\alpha,\beta,\beta,\beta$ - tetrafluoroethyl chloroformate, $\alpha,\beta,\beta,\beta$-tetrabromoethyl chloroformate, $\alpha,\beta,\beta,\beta$ - tetraiodoethyl chloroformate, $\alpha,\beta,\beta,\beta$ - tetrachloroethyl chlorothioloformate, $\alpha,\beta,\beta,\beta$ - tetrachloroethyl chlorothionoformate, and the like.

The manner in which the compounds of this invention can be prepared is more specifically illustrated in the following examples.

EXAMPLE 1

Preparation of N-(2-chloro-3-pyridyl)-$\alpha,\beta,\beta,\beta$-tetrachloroethylcarbamate A solution of 3 - amino - 2 - chloropyridine (6.4 grams; 0.05 mol) in ether (100 ml.), and pyridine (4 grams) were charged into a glass reaction vessel equipped with stirring and cooling means. The mixture was cooled to a temperature of about 0° C. and $\alpha,\beta,\beta,\beta$-tetrachloroethyl chloroformate (2.3 grams; 0.01 mol (dissolved in ether (50 ml.) was added dropwise thereto. The mixture was then stirred with continued cooling for a period of about 3 hours resulting in the formation of a precipitate. The mixture was warmed to room temperature and let stand overnight. After this time the reaction mixture was filtered to remove the precipitate. The filtrate was evaporated to yield a solid product. This product was extracted with hot heptane to yield the desired product N-(2-chloro-3-pyridyl)-$\alpha,\beta,\beta,\beta$-tetrachloroethylcarbamate having a melting point of 95° C. and having the following elemental analysis as calculated for $C_8H_5Cl_5N_2O_2$:

Theoretical (percent): C, 28.39; H, 1.49; Cl, 52.38; N, 8.28. Found (percent): C, 28.76; H, 1.83; Cl, 52.41.; N, 8.21.

EXAMPLE 2

Preparation of N - (5-methyl-3-pyridyl)-$\alpha,\beta,\beta,\beta$-tetrabromoethylcarbamate A solution of 3-amino-5-methylpyridine (7 grams; 0.05 mol) in ether (100 ml.), and pyridine (4 grams) are charged into a glass reaction vessel equipped with stirring and cooling means. The mixture is cooled to a temperature of about 5° C. and $\alpha,\beta,\beta,\beta$-tetrabromoethyl chloroformate (20.4 grams; 0.05 mol) dissolved in ether (50 ml.) is slowly added thereto over a period of about 15 minutes. After the addition is completed the reaction mixture is warmed to room temperature and is stirred for a period of about 2 hours. After this time the mixture is filtered and the filtrate is evaporated to yield a residue. The residue is recrystallized to yield the desired product N - (5-methyl-3-pyridyl)-$\alpha,\beta,\beta,\beta$-tetrabromoethylcarbamate.

EXAMPLE 3

Preparation of N - (2 - chloro-5-ethyl-3-pyridyl)-$\alpha,\beta,\beta,\beta$-tetrachloroethylcarbamate A solution of 3-amino-2-chloro-5-ethylpyridine (7.8 grams; 0.05 mol) in ether (100 ml.), and pyridine (4 grams) are charged into a glass reaction vessel equipped with stirring and cooling means. The mixture is cooled to a temperature of about 10° C. and $\alpha,\beta,\beta,\beta$-tetrachloroethyl chloroformate (11.5 grams; 0.05 mol) dissolved in ether (50 ml.) is slowly added thereto over a period of about 20 minutes. After the addition is completed, stirring and cooling are continued for about 1 hour. After this time the reaction mixture is filtered and the filtrate is evaporated to yield a residue. The residue is washed with water and is dried to yield the desired product N-(2-chloro-5-ethyl-3-pyridyl)-$\alpha,\beta,\beta,\beta$ - tetrachloroethylcarbamate.

Additional compounds within the scope of the present invention can be prepared by the procedure detailed in the foregoing examples. In the following examples are presented the essential starting materials required to prepare the indicated named compounds by the procedures heretofore described.

EXAMPLE 4

3-amino - 2 - bromopyridine+$\alpha,\beta,\beta,\beta$-tetrachloroethyl chloroformate=N - (2 - bromo - 3-pyridyl)-$\alpha,\beta,\beta,\beta$-tetrachloroethylcarbamate.

EXAMPLE 5

2-amino-4-n-propylpyridine+$\alpha,\beta,\beta,\beta$ - tetrachloroethyl chloroformate=N - (4-n-propyl-2-pyridyl)-$\alpha,\beta,\beta,\beta$-tetrachloroethylcarbamate.

EXAMPLE 6

4-amino-2-fluoropyridine+$\alpha,\beta,\beta,\beta$-tetrafluoroethyl chloroformate=N - (2 - fluoro-4-pyridyl)-$\alpha,\beta,\beta,\beta$-tetrafluoroethylcarbamate.

EXAMPLE 7

3 - amino-5-n-butylpyridine+$\alpha,\beta,\beta,\beta$ - tetrabromoethyl chloroformate=N - (5-n-butyl-3-pyridyl)-$\alpha,\beta,\beta,\beta$ - tetrabromoethylcarbamate.

EXAMPLE 8

3-amino-4-n-hexylpyridine+$\alpha,\beta,\beta,\beta$-tetraiodoethyl chloroformate=N - (4-n-hexyl-3-pyridyl)-$\alpha,\beta,\beta,\beta$ - tetraiodoethylcarbamate.

EXAMPLE 9

2-amino-4-iodopyridine+$\alpha,\beta,\beta,\beta$-tetrachloroethyl chloroformate=N - (4 - iodo-2-pyridyl) - $\alpha,\beta,\beta,\beta$-tetrachloroethylcarbamate.

EXAMPLE 10

3 - amino-2-chloropyridine+$\alpha,\beta,\beta,\beta$ - tetrachloroethyl chlorothionoformate=N - (2 - chloro-3-pyridyl)-$\alpha,\beta,\beta,\beta$-tetrachloroethylthionocarbamate.

EXAMPLE 11

3 - amino-2-chloropyridine+$\alpha,\beta,\beta,\beta$ - tetrachloroethyl chlorothioloformate=N - (2-chloro-3-pyridyl) - $\alpha,\beta,\beta,\beta$-tetrachloroethylthiolocarbamate.

As stated previously the compounds of this invention are useful as defoliants. That is to say they can be used to artificially induct leaf-drop in deciduous plants. The effect of these compounds on deciduous plants is equivalent to a light frost causing the formation of abscission layers of cells across the petiole base of the leaves of the plants and resulting in leaf-drop. This property to induct leaf-drop has great commercial value and can be used in harvesting a variety of crops.

The largest use at present for defoliants is in the defoliation of cotton plants. However, chemical defoliation can be practiced on other plants such as peas, soybeans, roses and others. Thus, while the primary use for the compounds of this invention is in the defoliation of cotton, their use as defoliants for deciduous plants in general is contemplated.

The practice of defoliating cotton plants results in numerous advantages including increased crop yield, improved quality bolls and better control of insect pests. If the leaves are removed from the cotton plant prior to harvesting, natural sunlight and ventilation aids the bolls to open, resulting in more uniform development of the bolls, and further aiding in the reduction of boll rot. Another advantage of defoliation is the absence of green-leaf stain on the bolls which normally results when cotton is harvested by mechanical means. A further advantage of defoliation permits earlier destruction of stalks, an important factor in controlling such pests as the boll weevil and pink bollworms.

For practical use as defoliants, the compounds of this invention are generally incorporated into compositions which comprise an inert carrier and a defoliating amount of such a compound. Such compositions, which can also be called formulations, enable the active compound to be applied conveniently to the plants to be defoliated in any desired quantity. These compositions can be solids such as dusts, granules or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of defoliants can be dispersed under superatmospheric pressure as aerosols. However, preferred liqjuid defoliant compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the plants. The emulsifiers most commonly used in these concentrates are nonionic or mixtures of nonionic with anionic surface-active agents. With the use of some emulsifier systems an inverted emulsion (water in oil) can be prepared.

A typical defoliant composition according to this invention is illustrated by the following example, in which the quantities are in parts by weight.

EXAMPLE 12

Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the plants which are to be defoliated.

The compounds of this invention can be applied as defoliants in a manner recognized by the art. One method of defoliating plants comprises contacting said plants in an amount sufficient to cause defoliation with a composition comprising an inert carrier and, as an essential active ingredient, a compound of the present invention. The concentration of the new compounds of this invention in the compositions will vary with the type of formulation and the purpose for which it is designed, but generally the compositions will comprise from about 0.05 to about 95 percent by weight of the active compounds of this invention. In a preferred embodiment of this invention, the compositions will comprise from about 5 to about 75 percent by weight of the active compound. The compositions can also comprise such additional substances as pesticides, such as herbicides, insecticides, nematocides, fungicides, and the like; stabilizers, spreaders, deactivators, adhesives, stickers, fertilizers, activators, synergists, and the like.

The amount of compound required for defoliation will depend on a variety of factors such as the kind of plant to be defoliated and the density of plants in the area. Thus while the application of up to only about four ounces of active compound per acre may be sufficient for a sparsely planted area, the application of ten pounds or more of active compound per acre may be required for total defoliation of a densely planted area.

The utility of the new compounds of this invention as defoliants can be demonstrated in an experiment wherein the test compounds formulated as aqueous emulsions of acetone solutions are sprayed on cotton plants approximately 2 to 3 months old. The plants are then held in a greenhouse for a period of 10 days after which time the percent defoliation is determined. The results of this experiment indicate the high order of activity of the compounds of the present invention as defoliants.

The compounds of this invention are also useful as herbicides and when used as such are incorporated into herbicidal compositions comprising an inert carrier and, as an essential active ingredient, in a quantity toxic to weeds, a compound of this invention. These herbicidal compositions are similar to and can be prepared in the manner heretofore described for the defoliant compositions.

The new compounds of this invention are particularly valuable for weed control because they are toxic to many species and groups of weeds while they are relatively non-toxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

Weeds are undesirable plants growing where they are not wanted, having no economic value, and interfering with the production of cultivated crops, with the growing of ornamental plants, or with the welfare of livestock. Many types of weeds are known, including annuals such as pigweed, lamb's-quarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle, hounds-tongue, moth mullein and purple star thistle; or perennials such as white cockle, perennial rye-grass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail and winter-cress.

Similarly such weeds can be classified as broadleaf or grassy weeds. It is economically desirable to control the growth of such weeds without damaging beneficial plants or livestock.

The herbicidal toxicity of the new compounds of this invention can be illustrated by many of the established testing techniques known to the art, such as pre- and post-emergence testing.

The herbicidal activity of the compounds of this invention was demonstrated by experiments carried out for the pre-emergence control of crabgrass, downy brome and foxtail. In these experiments small plastic greenhouse pots filled with dry soil were seeded with the various weed seeds. Twenty-four hours or less after seeding the pots were sprayed with water until the soil was wet and the test compound N-(2-chloro-3-pyridyl)-$\alpha,\beta,\beta,\beta$ - tetrachloroethylcarbamate formulated as an aqueous emulsion of an acetone solution containing emulsifiers was sprayed at the indicated concentrations on the surface of the soil.

After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants was rated on a scale of from 0 to 10, as follows: 0=no injury, 1,2=slight injury, 3,4=moderate injury, 5,6=moderately severe injury, 7,8,9=severe injury and 10=death. The effectiveness of these compounds is demonstrated by the following data:

TABLE 1

| Weed species | Concentration of test compound in lbs./acre | Percent control |
|---|---|---|
| Crabgrass | 1 | 0 |
| Do | 2 | 4 |
| Do | 4 | 7 |
| Downybrome | 1 | 0 |
| Do | 2 | 2 |
| Do | 4 | 8 |
| Foxtail | 1 | 7 |
| Do | 2 | 8 |
| Do | 4 | 9 |

I claim:
1. A compound of the formula

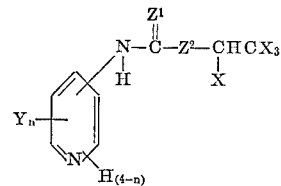

wherein each X is halogen; $Z^1$ and $Z^2$ are selected from the group consisting of oxygen and sulfur; Y is selected from the group consisting of halogen and alkyl of 1–6 carbon atoms; and $n$ is an integer from 0 to 2.

2. The compound of claim 1 N-(2-chloro-3-pyridyl)-$\alpha,\beta,\beta,\beta$-tetrachloroethylcarbamate.

References Cited

UNITED STATES PATENTS 3,376,307  4/1968  Hyden et al. _____ 260—294.3
3,364,225  1/1968  Wilbert et al. _____ 260—295

ALAN L. ROTMAN, Primary Examiner

U.S. Cl. X.R.

71—94; 260—294.8, 295